US012569865B2

(12) United States Patent
Ackerman et al.

(10) Patent No.: US 12,569,865 B2
(45) Date of Patent: Mar. 10, 2026

(54) ELECTROSTATIC SPRAY NOZZLE INCLUDING INDUCTION RING

(71) Applicant: Spraying Systems Co., Wheaton, IL (US)

(72) Inventors: Thomas Elliot Ackerman, Francestown, NH (US); Jason Tyler Rusch, Holus, NH (US); Lyndon John Wee Sit, Hudson, NH (US)

(73) Assignee: Spraying Systems Co., Wheaton, IL (US)

(*) Notice: Subject to any disclaimer, the term of this patent is extended or adjusted under 35 U.S.C. 154(b) by 451 days.

(21) Appl. No.: 18/127,179

(22) Filed: Mar. 28, 2023

(65) Prior Publication Data

US 2023/0311138 A1 Oct. 5, 2023

Related U.S. Application Data

(60) Provisional application No. 63/325,709, filed on Mar. 31, 2022.

(51) Int. Cl.
*B05B 5/043* (2006.01)
*B05B 5/00* (2006.01)
*B05B 5/03* (2006.01)

(52) U.S. Cl.
CPC .............. *B05B 5/043* (2013.01); *B05B 5/006* (2013.01); *B05B 5/03* (2013.01)

(58) Field of Classification Search
CPC ........... B05B 5/006; B05B 5/03; B05B 5/043; B05B 5/0533; B05B 5/053

(Continued)

(56) References Cited

U.S. PATENT DOCUMENTS 4,106,697 A 8/1978 Sickles et al.
4,347,984 A * 9/1982 Sickles .................. B05B 5/043 239/707

(Continued)

FOREIGN PATENT DOCUMENTS

EP 1614479 A1 1/2006

OTHER PUBLICATIONS

Johnson R.K. et al. "Electrostatic-Enhanced Atomization for Spray Drying of Milk" LWT-Food Science and Technology, vol. 29, No. 1-2, Jan. 1, 1996 (Jan. 1, 1996), pp. 71-78, XP0555779142, United Kingdom.

(Continued)

*Primary Examiner* — Cody J Lieuwen

(74) *Attorney, Agent, or Firm* — Leydig, Voit & Mayer, Ltd.

(57) ABSTRACT

An electrostatic spray nozzle assembly is described that includes an induction ring and a fluid tip. The induction ring generates an electrical field for inducing an electrical charge on droplets of a feedstock liquid from the fluid tip that pass through an opening of the induction ring. The induction ring is electrically coupled to an electrical induction field source via a first conductive path provided by conductive surfaces of: a nozzle head holding the induction ring, and a purge gas tube holding the nozzle head. Feedstock flowing through the fluid tip is electrically coupled to a charge carrier source via a second conductive path provided by at least a conductive surface of a fluid tube coupled to the fluid tip. The first conductive path and the second conductive path are electrically isolated by an insulating barrier.

23 Claims, 7 Drawing Sheets

(58) Field of Classification Search
USPC ...................................... 239/690.1, 706, 707
See application file for complete search history.

(56) References Cited

U.S. PATENT DOCUMENTS

| | | | | | |
|---|---|---|---|---|---|
| 4,762,274 | A | 8/1988 | Burls et al. | | |
| 5,765,761 | A * | 6/1998 | Law | B05B 5/043 | 239/700 |
| 2004/0195403 | A1* | 10/2004 | Atterbury | A61M 15/02 | 239/690 |
| 2007/0039546 | A1* | 2/2007 | Amari | B05B 5/043 | 118/629 |
| 2011/0186646 | A1* | 8/2011 | Tsuji | B05B 5/0533 | 239/3 |
| 2012/0240851 | A1* | 9/2012 | Murata | B05B 5/03 | 118/621 |
| 2014/0110493 | A1* | 4/2014 | Cooper | B05B 5/087 | 239/3 |

OTHER PUBLICATIONS

International Bureau, International Search Report in International Application No. PCT/US2023/016523, mailed Jun. 30, 2023).

* cited by examiner

ELECTROSTATIC SPRAY NOZZLE INCLUDING INDUCTION RING

CROSS-REFERENCE TO RELATED APPLICATIONS

This patent application claims the benefit of U.S. Provisional Patent Application No. 63/325,709, filed Mar. 31, 2022, entitled "ELECTROSTATIC SPRAY NOZZLE INCLUDING INDUCTION RING", which is expressly incorporated herein by reference in its entirety, including any references therein.

AREA OF THE INVENTION

The present disclosure generally relates to electrostatic sprayer systems. More particularly, the present disclosure relates to an arrangement for providing an electrostatically charged spray using an induction ring in an electrostatic spray drying system.

BACKGROUND OF THE INVENTION

In known electrostatic sprayer systems, liquid feed stock is charged to an electrical potential of tens of thousands of volts (e.g., 30 kilovolts) and discharged at a spray outlet. The high voltage potential causes the resulting electrically charged spray droplets to repel one another and thereby ensure a wide and uniform dispersal of the spray droplets and thereby facilitate efficient and complete drying of solids, which are suspended in the liquid feed stock, during a spray operation.

In such known electrostatic sprayer systems, during operation thereof, charging of liquid feed stock occurs prior to the feed stock being converted to a spray at a nozzle outlet aperture. Such arrangement results in a high voltage presence that extends from an exit point of the feed stock at the spray nozzle tip to a tank containing the liquid feed stock. As a consequence the entire feedstock tank and the entire path of the feedstock from the tank to an exit aperture of the spray nozzle must be electrically insulated to avoid a short circuit and loss of charge. As such, this approach requires specially configured components along the path of the electrically charged feedstock—including pumps, flow meters, pressure sensors, nozzle aperture actuators, etc.

As an alternative to the above-described electrostatic sprayer arrangement, where the entire feedstock is charged prior to exiting a spray nozzle, electrostatic spray systems exist that include an induction ring positioned proximate an exit aperture of the spray nozzle to induce a charge on spray droplets exiting a spray nozzle. The induction ring, positioned at an exit point of the spray nozzle, is maintained at a high magnitude (either positive or negative) voltage creating a high magnitude electrical field potential that draws (or repels in the instance of a strong negative electric field) electrons from the liquid feedstock exiting the spray nozzle. The attracted (or repelled) electrons result in a negative (or positive) charge being carried by droplets exiting the spray nozzle.

An example of using an induction ring to charge a spray after exiting a nozzle is provided, for example, in U.S. Pat. No. 4,343,433 for "Internal Atomizing Spray Head with Secondary Annulus Suitable for Use with Induction Charging Electrode."

SUMMARY OF THE INVENTION

An induction ring-based electrostatic spray nozzle is provided herein for use in an electrostatic sprayer system. The arrangement includes an induction ring and a fluid tip. The induction ring generates an electrical field for inducing an electrical charge on droplets of a feedstock liquid from the fluid tip that pass through an opening of the induction ring. The induction ring is electrically coupled to an electrical induction field source via a first conductive path provided by conductive surfaces of: a nozzle head holding the induction ring, and a purge gas tube holding the nozzle head. Feedstock flowing through the fluid tip is electrically coupled to a charge carrier source via a second conductive path provided by at least a conductive surface of a fluid tube coupled to the fluid tip. The first conductive path and the second conductive path are electrically isolated by an insulating barrier.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

In the present disclosure, an arrangement is provided for providing an electrostatically charged spray nozzle that incorporates an electrical circuit arrangement that ensures proper operation of an electrostatic spray nozzle that includes an induction ring for providing an electrostatic charge to the output spray of the electrostatic spray nozzle.

Figure 1:
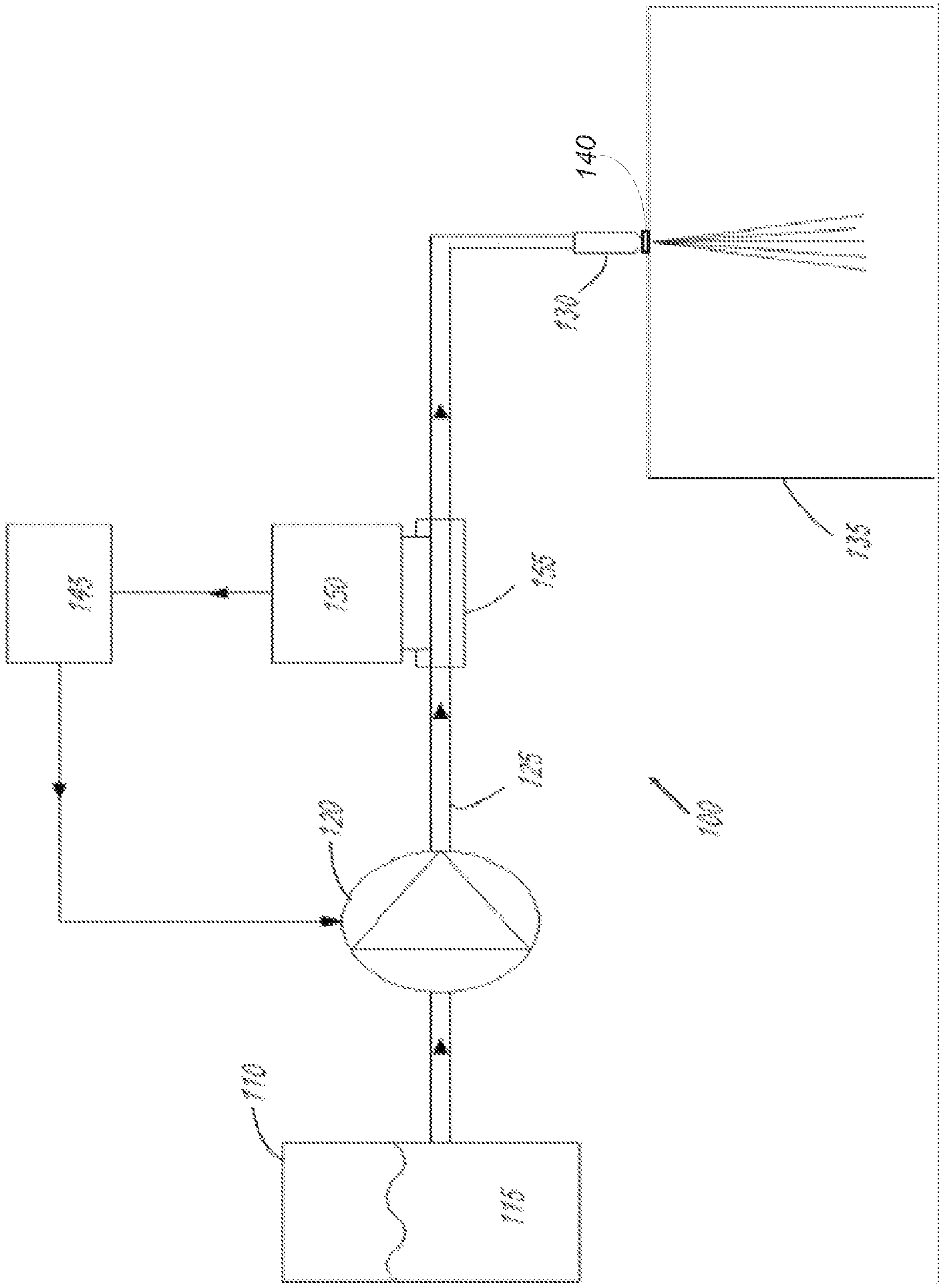
FIG. 1 is a schematic diagram of an exemplary electrostatic spray drying system in in accordance with an illustrative example.

Turning to FIG. 1, an exemplary electrostatic spray drier system 100 is illustratively depicted. In the illustrative example, a tank 110 holds a liquid feed stock 115. The liquid feed stock 115 is drawn by a motor-driven pump 120 from the tank 110 into and through a feed line 125 for discharge at an electrostatic spray nozzle 130 inside a spray drying chamber 135. Importantly, the spray nozzle includes an induction ring 140. The induction ring 140 is positioned at an exit aperture of the electrostatic spray nozzle such that, in operation, the high voltage electric field generated by the induction ring (e.g., 3000 Volts) applies/establishes an electrostatic charge potential to droplets within a spray created from the liquid feed stock 115 discharged from the electrostatic spray nozzle 130.

An aspect of a particular configuration, of the electrostatic spray nozzle 130 including the induction ring 140, adapts/configures the electrostatic spray nozzle 130 for particular use in spray drying of a feedstock. In particular a sufficient voltage differential is applied, between the induction ring 140 and the feedstock at an exit aperture of the nozzle 130, to enhance droplet formation from the feedstock material by an induced charge present in the liquid passing from the exit aperture of the nozzle 130. Such voltage may be 3,000 to 4,000 volts, which is substantially lower (e.g., an order of magnitude) than known electrostatic spraying systems that operate at, for example, 30,000 volts. Additionally, given variations in conductivity of feedstock, a closed loop control arrangement is contemplated in illustrative examples to facilitate an automatic setting of a voltage difference between the induction ring 140 and the exit aperture of the electrostatic spray nozzle 130 to ensure sufficient voltage is applied to ensure enhanced/desired droplet formation without excessive voltage being applied. Such feedback arrangement can be carried out, for example, by incorporating an electrical current sensor in the induction circuit that senses both too little current (i.e. induction electrical field magnitude needs to be increased) and too much current (i.e., induction electrical field magnitude needs to be decreased).

A controlled liquid feed stock delivery system, including the pump 120, delivers the liquid feed stock 115 at a specified flow rate to the spray nozzle 130. The motor-driven pump 120 is controlled by a controller 145 (e.g., a programmable logic controller) in accordance with a specified set point and a currently sensed flow rate. An operator specifies, for example, a flow rate set point via a human-machine interface (HMI) and then activates the motor-driven pump 120. Thereafter, the controller 145 monitors (via sensor input signals) a flow rate of the liquid feed stock and adjusts (via motor control signals) motor speed of the motor-driven pump 120 to maintain a set/specified flow rate of the liquid feed stock 115 to the spray nozzle 130. In order to maintain a desired flow, the controller 145 continuously receives a measurement signal indicative of an instantaneous flow rate of the liquid feed stock passing through a feed line to the spray nozzle. An in-line flowmeter 150 measures instantaneous flow rate of the liquid feed stock 115 through a pipe section 155 to which the in-line flowmeter 150 is operationally mounted. The in-line flowmeter 150, in turn, provides a signal to the controller 145 that maintains a historical record of sensed flow and provides control over the overall operation of the electrostatic spray drier system 100 (including a speed of the motor-driven pump 130).

Details of the general structure of the electrostatic spray drying system 100, including the controller 145, are well known to those in the industry and thus are not discussed in detail herein. Rather, attention is directed to an exemplary electrical/structural arrangement of spray nozzle including an induction ring mounted proximate an exit aperture thereof for providing an electrostatically charted droplet stream of the liquid feedstock in accordance with illustrative examples of the present disclosure.

Figure 2A:
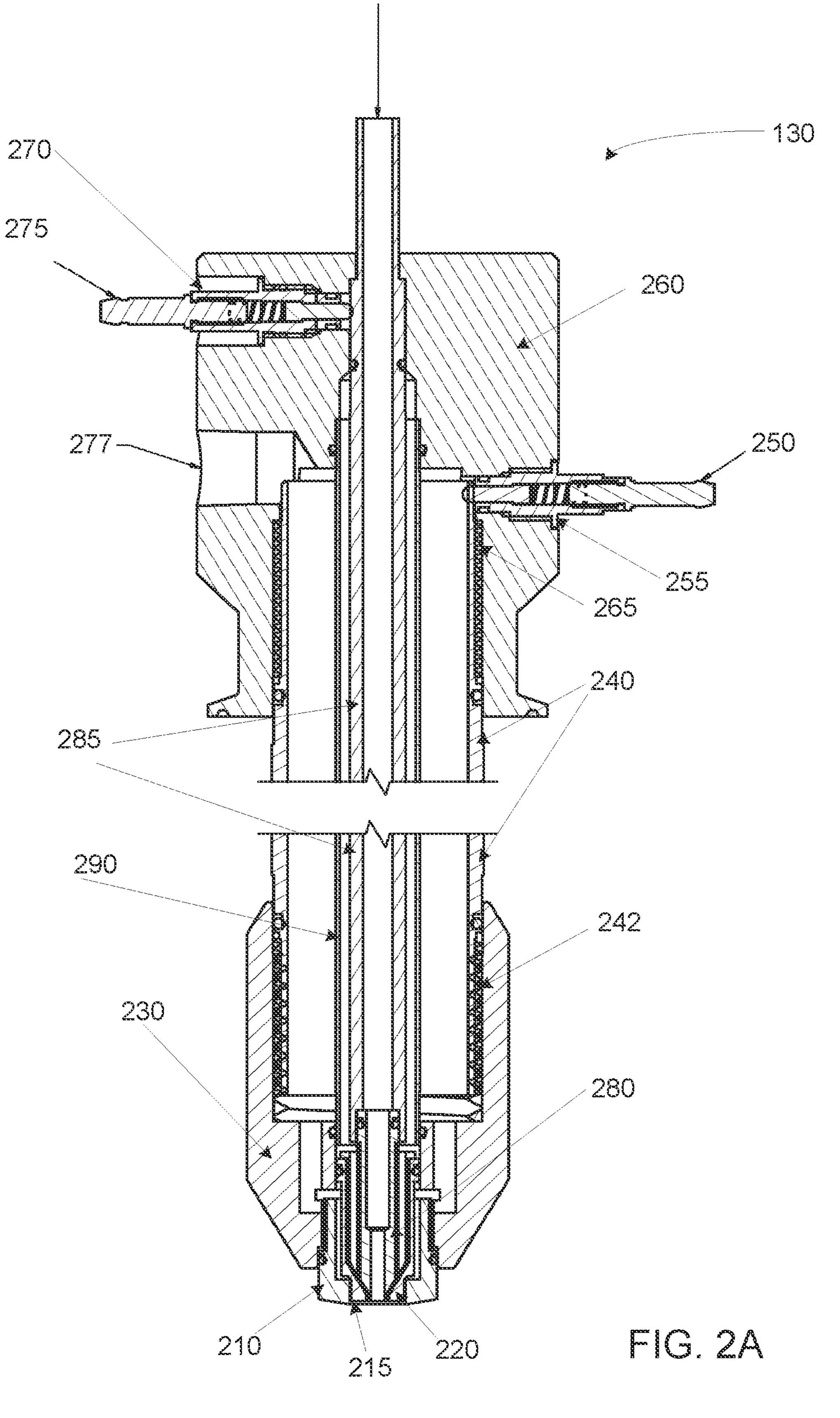
FIG. 2A is a first cross-section view of an electrostatic spray nozzle assembly in accordance with an illustrative example.

By way of a first specific example, the spray nozzle 130 is a specially configured nozzle assembly that, in operation, exhibits certain electrical properties facilitating generation of a continuous flow of electrostatically charged spray droplets. Turning to FIG. 2A, an exemplary electrostatic spray nozzle arrangement is illustratively depicted where electrostatic charging of spray droplets is achieved by an electrical circuit arrangement including an induction ring 210 (corresponding to the induction ring 140 in FIG. 1) provided in the form of an electrically conductive metal retaining cap positioned at an exit aperture of the spray nozzle 130. An opening 215 of the induction ring 210 is sufficiently wide to avoid, with the aid of a purging gas stream, excessive buildup of the liquid feedstock emitted from an opening of an atomizing gas cap 220 that passes in droplet form through the opening 215. By way of example, the opening 215 has an inner diameter on the order of less than 1 inch for an applied electrical field having a voltage of 3,000 to 4,000 volts (3-4 kilovolts). More particularly, the opening 215 has a diameter of about 0.7 inches. However, in accordance with various spray drying applications, the diameter of the opening 215 and/or the applied voltage (electrical field potential between the induction ring 215 and liquid feedstock exiting the nozzle) are modified in accordance with spray pattern (wide/narrow spray field), nozzle aperture position (linear displacement along path of spray field) in relation to the opening 215 of the induction ring 210. In the illustrative example, the atomizing gas cap 220 is a non-conductive insulating material (e.g., a rigid plastic material).

A first conductive path is provided for generating an electrostatic field at the opening 215 of the induction ring 210 to electrostatically charge droplets of feedstock emitted from the atomizing gas cap. To that end, the induction ring 210 physically (by complementary screw threating) and conductively engages an electrically conductive surface of a nozzle head 230. The first conductive path is further provided by a further physical and conductive engagement of the nozzle head 230 with a purge gas tube 240. By way of example, the nozzle head 230 and the purge gas tube 240 are physically and conductively engaged by complementary screw thread surfaces at 242. The purge gas tube 240 is also provided with an electrically conductive surface providing an electrically conductive path from the nozzle head 230 to an induction field (high voltage) electrode 250 from a high voltage field signal source (not shown).

In an illustrative example, outer surfaces of electrically conductive components, (e.g., the induction ring 210) are coated with an electrically insulating layer to reduce the possibility of arcing within the spraying environment. As such, only the inner surface (or portion thereof) of the exposed surfaces of the induction ring 210 (as opposed to a non-exposed threaded surface of the induction ring 210 that is also a conductive surface) is a conductive surface. Such electrically insulating layer is provided by, for example, a polytetrafluoroethylene (PTFE) coating.

In yet a further illustrative example, all exposed surfaces of electrically conductive components—even the inner exposed surface of the induction ring 210—are coated with a strong dielectric material (e.g., PTFE) to provide an electrical insulating barrier between the high (magnitude) voltage of the induction ring 210 and low (magnitude) voltage of the feed stock as well as any potentially ground connection sources to which the feed stock comes into contact prior to exiting the spray nozzle. Such arrangement facilitates preventing, minimizing any current flow from the induction ring during operation of the illustrative electrostatic spray drying system.

A second conductive path is provided for establishing a complementary electrical (e.g., ground) path from conductive feed lines through which the feedstock passes from the tank 110 (see FIG. 1) to the atomizing gas cap 220. The second conductive path provides a source for inducing a charge (opposite the field potential generated at the opening 215) on the droplets passing from a fluid tip 280 having an electrically grounded conductive surface in contact with the feedstock) through an electric field at the opening 215. The second conductive path continues at a physical and electrical connection between the fluid tip 280 and a fluid tube 285 that provides the feedstock to the fluid tip 280. Similarly to the outer surface of the induction ring, the outer surfaces of the fluid tip 280 and fluid tube 285 are coated with an electrically insulating layer (e.g., PTFE).

An atomizing gas tube 290 provides atomizing gas to the atomizing gas cap 220. The atomizing gas tube 290 is, by way of example made of a non-electrically conductive material (e.g., a rigid plastic, ceramic, etc.) that is configured to provide a sealed engagement with the atomizing gas cap 220. Alternatively, the atomizing gas tube 290 comprises a conductive material coated with an electrically insulating material. As such, the atomizing gas tube 290 and atomizing gas cap 220 provide an electrically insulating barrier between the first conductive path and the second conductive path described herein above. It is noted that such electrically insulating characteristic may alternatively be achieved by coating exposed surfaces with an insulating coating (e.g., PTFE).

As shown in FIG. 2A, a nozzle body 260 is physically configured with several receptacles/openings for maintaining physical/electrical engagement between components of the spray nozzle 130 illustratively depicted herein. In the illustrative example, the nozzle body 260 includes an induction field electrode receptacle 255 holding the induction field electrode 250 in electrically conductive engagement with the electrically conductive surface of the purge gas tube 240. The nozzle body 260 includes a ground electrode receptacle 270 holding an electrical ground electrode 275 in electrically conductive engagement with the electrically conductive surface of the fluid tube 285. An induction ring purge gas port 277 provides an opening for feeding a purge gas that flows through the purge gas tube 240 to the opening 215 in the induction ring 210. As further shown in FIG. 2B (a further cross sectional view rotated 90 degrees from the view depicted in FIG. 2A), the nozzle body 260 further includes an atomizing gas port 295 that provides an opening for feeding an atomizing gas to the atomizing gas tube 290.

As shown in FIG. 2A, the nozzle body 260 includes a cylindrical receptacle having a threaded surface at 265 to hold in place the purge gas tube 240 having a complementary threaded outer surface.

Figure 2B:
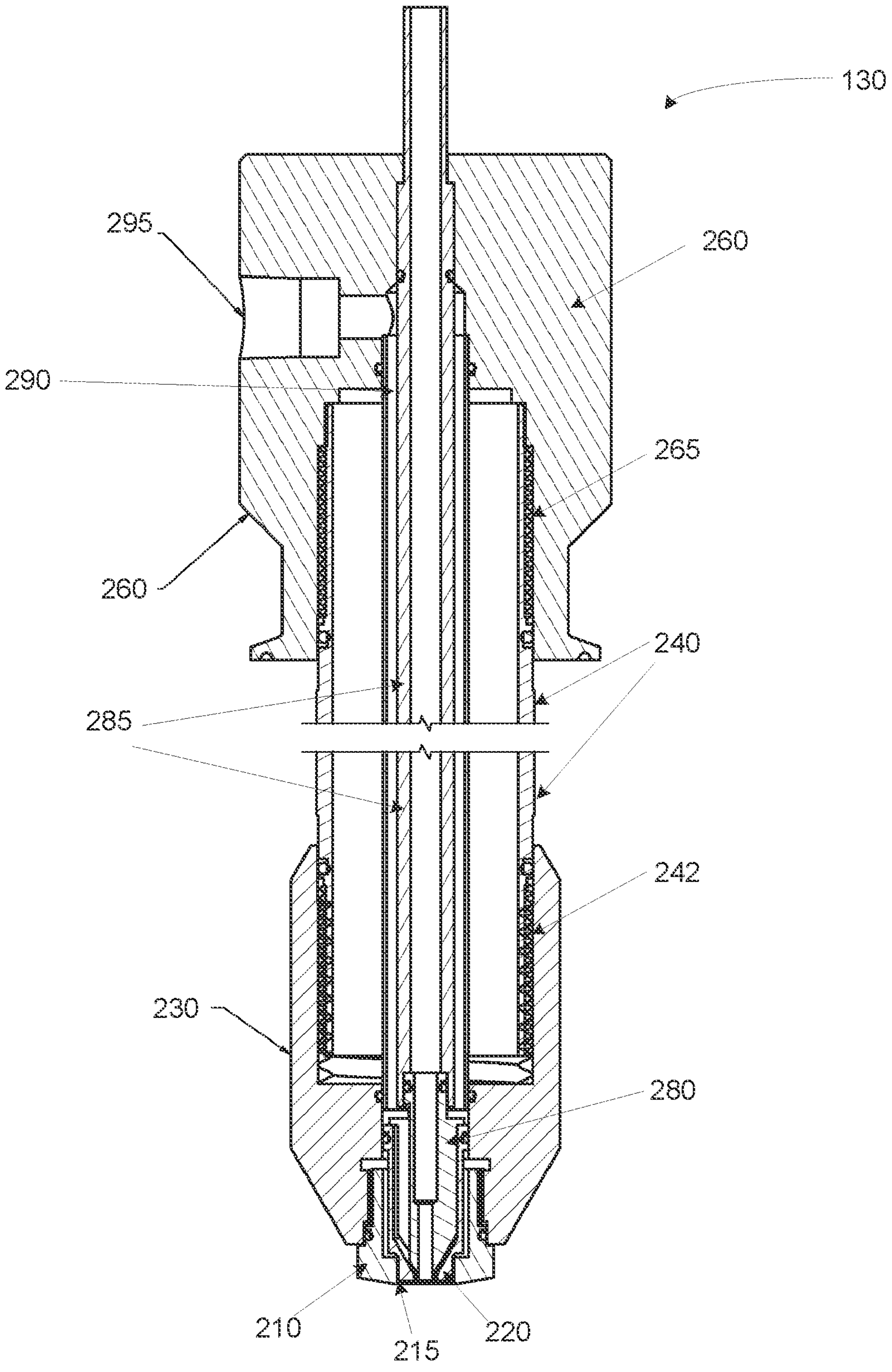
FIG. 2B is a second cross-section view of an electrostatic spray nozzle assembly in accordance with an illustrative example.
Figure 3:
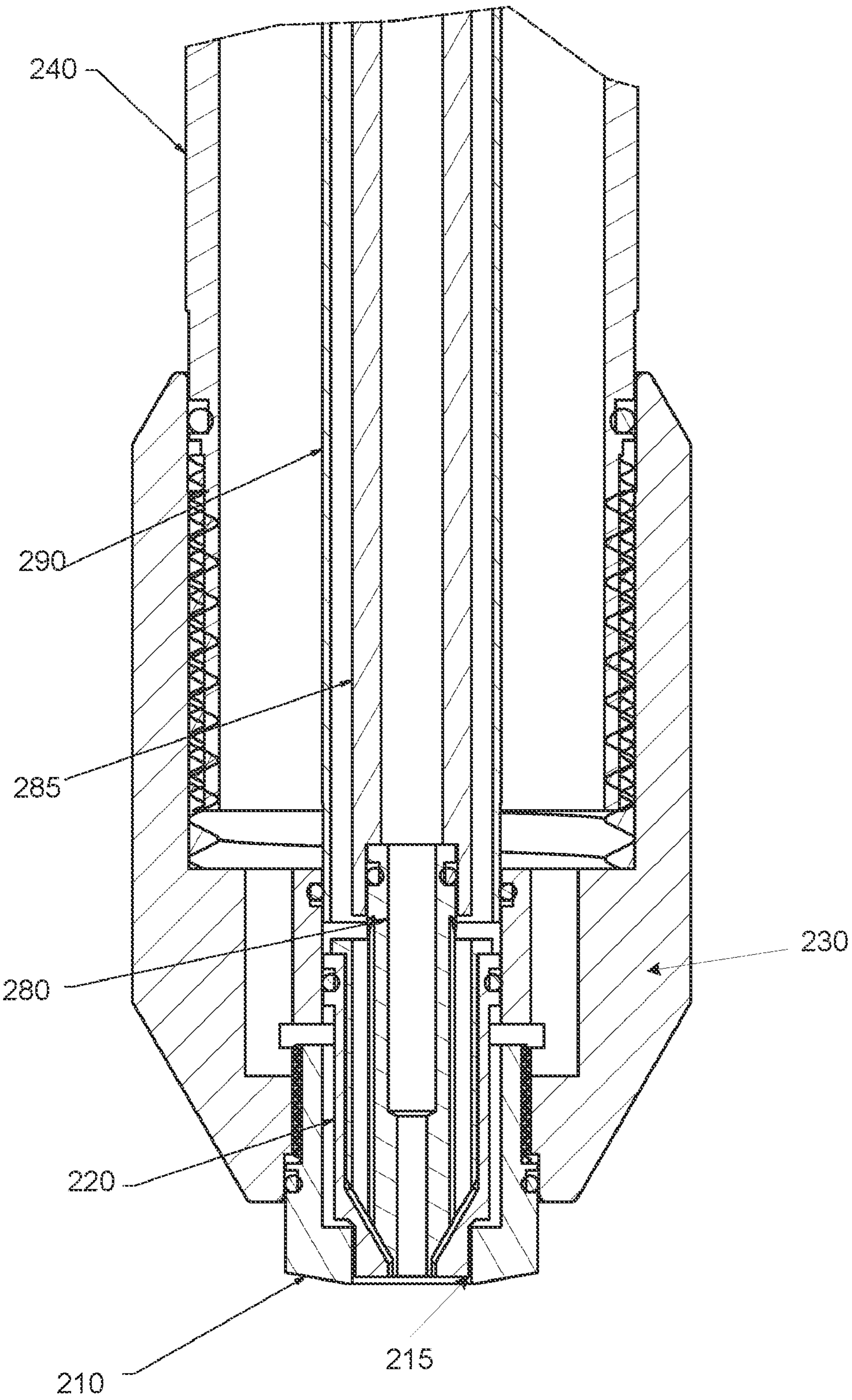
FIG. 3 is a detail cross-section view of nozzle head section, including an induction ring, of the electrostatic spray nozzle assembly depicted in FIGS. 2A and 2B.
Figure 4:
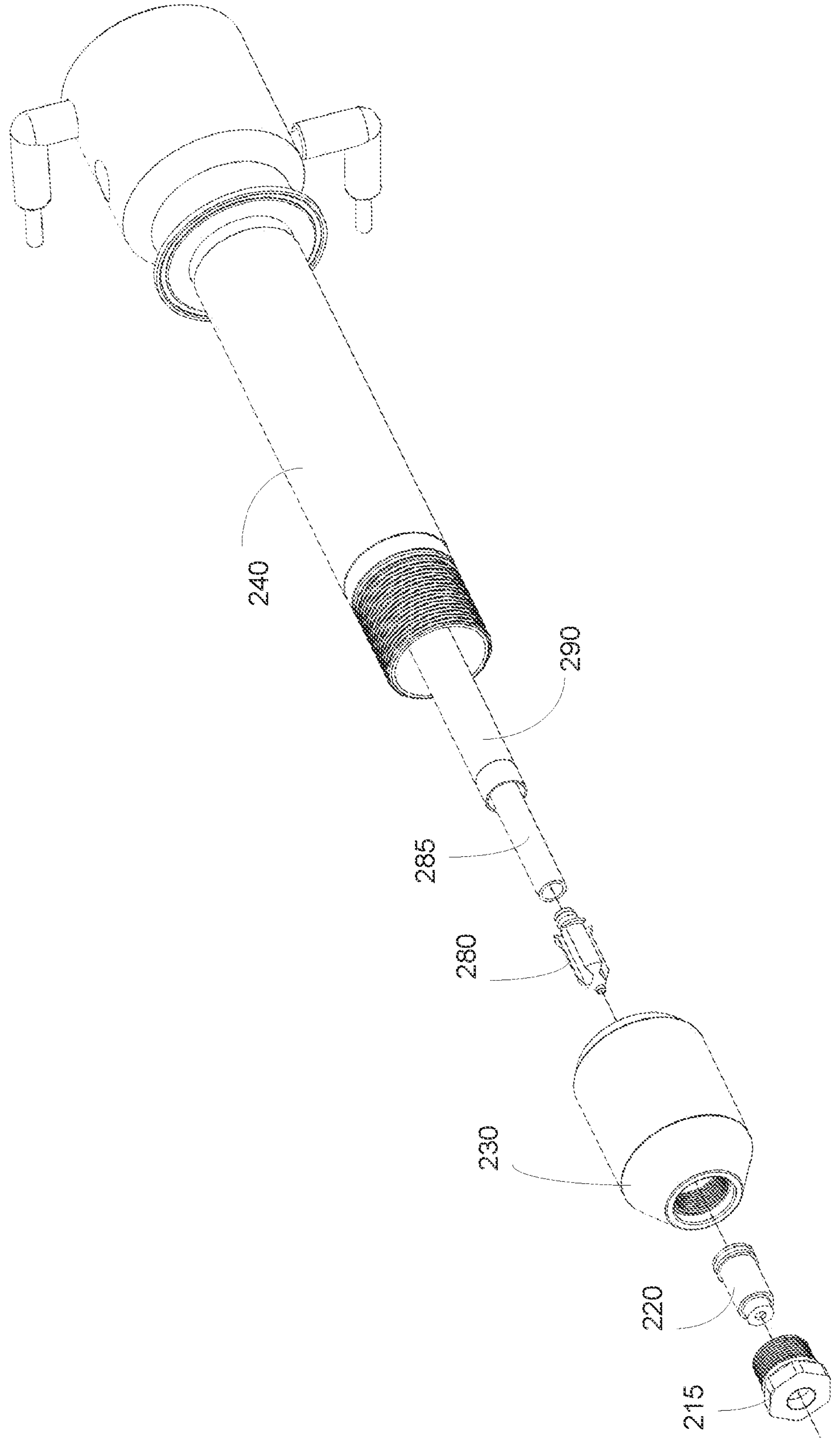
FIG. 4 is an exploded perspective view of the electrostatic spray nozzle assembly depicted in FIGS. 2A and 2B.

Turning to FIG. 3, an additional detailed view is provided of the nozzle head portion of the spray nozzle depicted in FIGS. 2A and 2B to enable a clearer view of the various physical relationships depicted in FIGS. 2A and 2B and the corresponding written description provided herein above. Additionally, FIG. 4 provides an exploded perspective view of the electrostatic spray nozzle assembly depicted in FIGS. 2A and 2B to provide additional visual details of the illustrative example of an electrostatic spray nozzle in accordance with the current disclosure.

Figure 5:
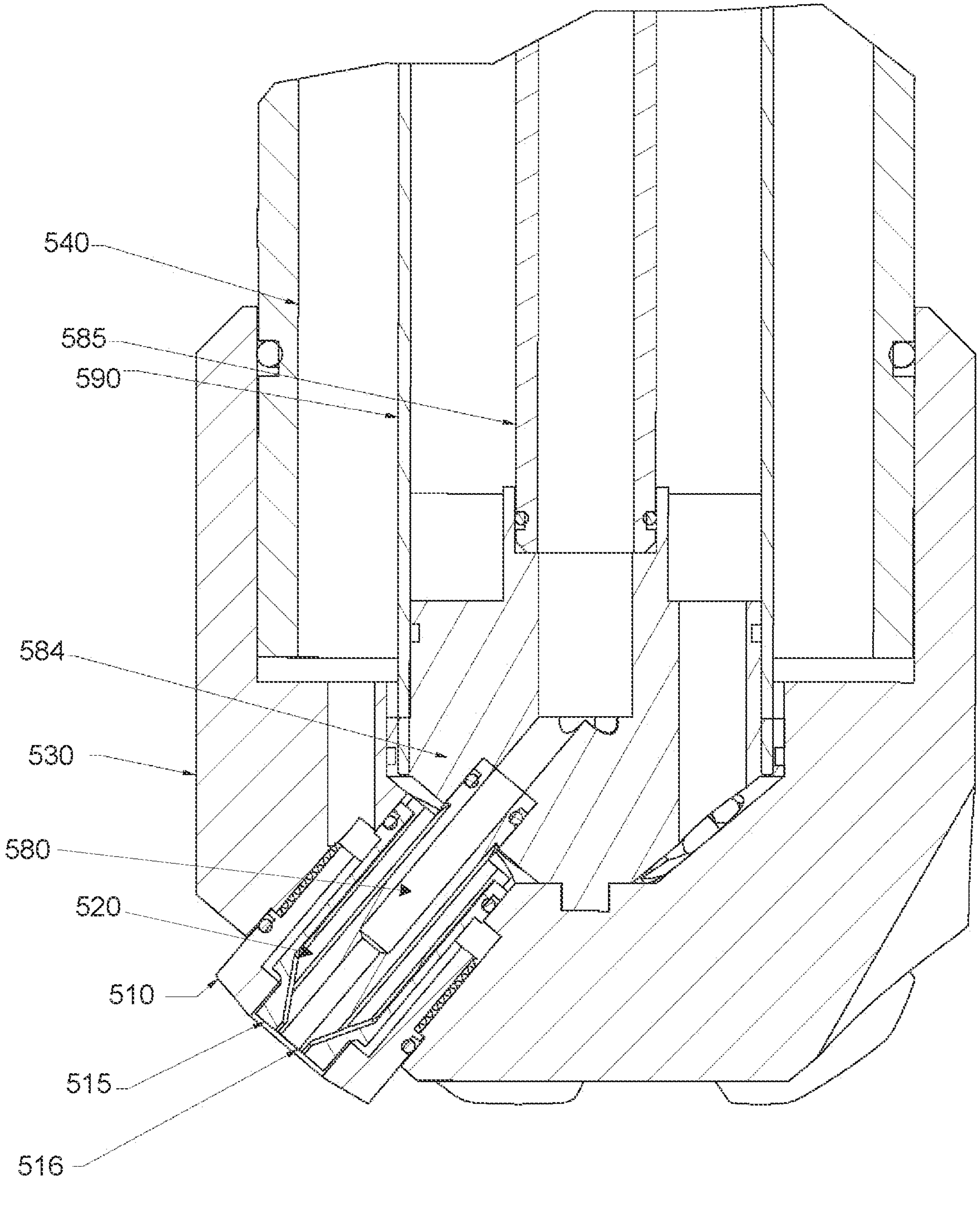
FIG. 5 is a cross-section view of a multi-nozzle spray assembly incorporating the electrostatic spray nozzle assembly depicted in FIGS. 2A and 2B.

Turning to FIG. 5, an illustrative multi-head assembly is provided in cross-section to show details of one of multiple spray nozzles incorporated into a multi-nozzle assembly. In the illustrative example, a fluid tip 580 (grounded) receives feedstock fluid from a feedstock delivery manifold 584 that is fed by a fluid tube 585 that are also grounded to form the second (grounded) conductive path through which feedstock passes prior to atomizing and expulsion from one of multiple openings (such as opening 515) of the multiple spray nozzle apertures (such as aperture 516 proximate an induction ring 510). Similarly to the single nozzle arrangement described above, a plurality of threaded receptacles are provided (one for each induction) in a nozzle head 530 (electrically connected to the induction ring 510) for holding a corresponding induction ring (e.g., induction ring 510) and providing a part of the first conductive path from the induction rings to the electrical induction field source described herein above with reference to a single spray nozzle configuration. The nozzle head 530 is electrically connected to a purge gas tube 540 providing a further segment of the first conductive path.

With continued reference to FIG. 5, an atomizing gas cap 520 and an atomizing gas tube 290 provide an electrical insulating barrier between the first conductive path and the second conductive path described herein above with reference to the illustrative multi-spray nozzle head structure in accordance with the current disclosure.

Figure 6:
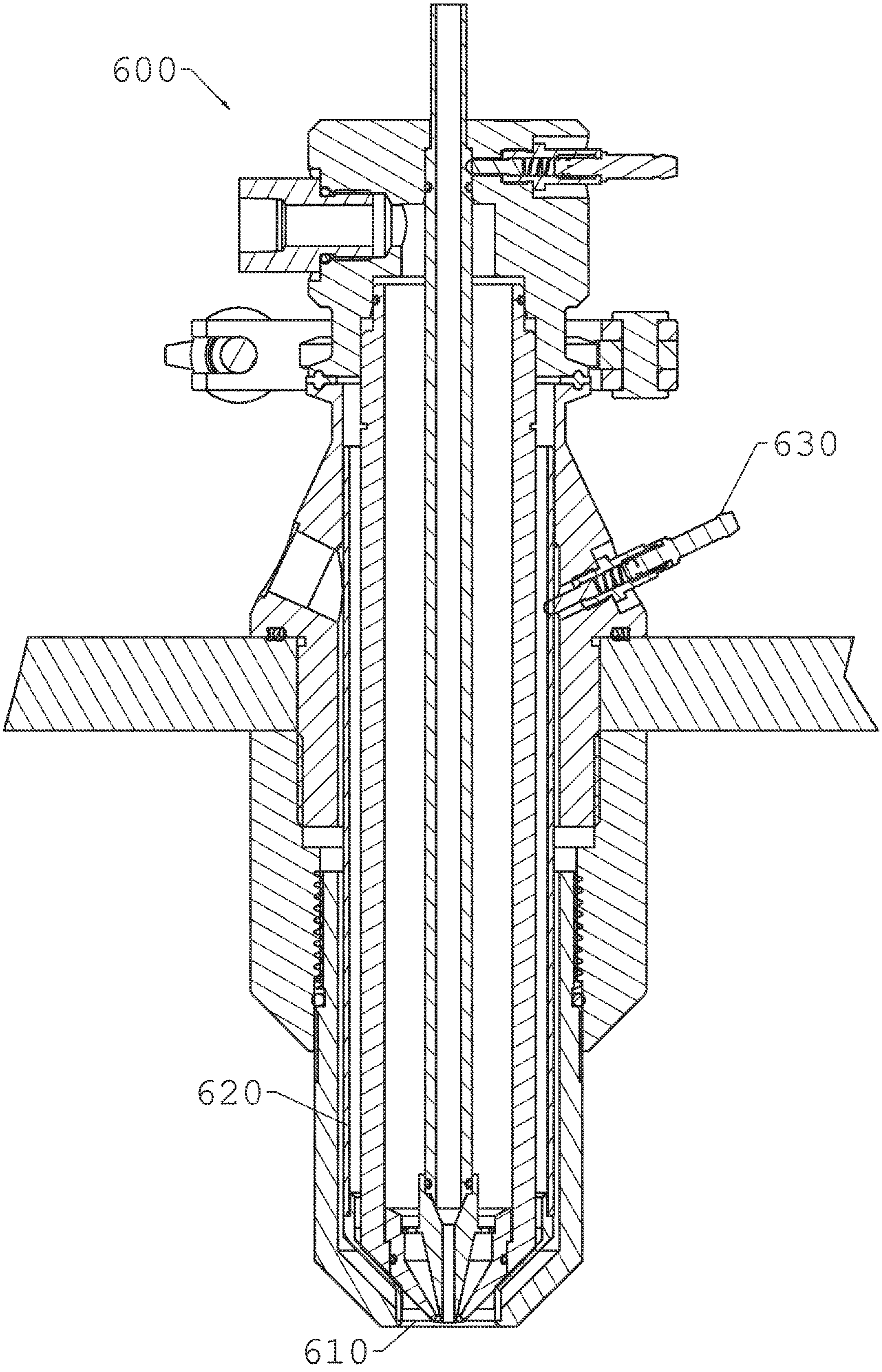
FIG. 6 is a further cross-sectional view of an electrostatic spray nozzle assembly in accordance with a further illustrative example.

Turning to FIG. 6, a further cross-sectional view of an electrostatic spray nozzle assembly 600 is depicted in accordance with a further provided illustrative example. In the illustrative alternative arrangement, the second conductive path (traversed by the feed stock and electrically coupled to electrical ground) and insulating barrier between the second conductive path and the first conductive path are substantially the same as the illustrative example provided in FIG. 2.

However, in the illustrative example provided by FIG. 6 conductive components of the first conductive path are physically shielded, by nozzle mount/shell components, from an environment external to the electrostatic spray nozzle 600. In the illustrative example, an air atomizer is provided inside the circumference of the induction ring 610. A purge air stream is provided by a stainless steel tube 620 connecting the induction ring 610 to a high (magnitude) voltage source (e.g., at electrode 630). In the illustrative example, the air atomizer component may be interchanged with any of a variety of nozzles including: a purely hydraulic nozzle, an internal mixing air atomizer, an ultrasonic atomizer, etc. Importantly, the nozzle mount/shell components provide a physical and electrically insulating barrier between the induction ring 610 and a chamber containing dust created by the dried feed stock.

Furthermore, while the illustrative examples have been depicted and described with reference to an exemplary electrostatic spray nozzle assembly configurations, the disclosure is not limited to such assemblies. It will be readily appreciated that, in view of the current disclosure, the advantages of the current disclosure are also applicable to a variety of electrostatic spraying systems that include an induction ring. As such, the current disclosure is intended to apply to a wide variety of electrostatic spray nozzle arrangements—with appropriate adjustments to the above-described structures to accommodate variations in particular electrostatic spray applications.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrostatic spray nozzle assembly comprising:
an induction ring; and
a fluid tip,
wherein the induction ring generates an electrical field for inducing an electrical charge on droplets of a feedstock liquid from the fluid tip that pass through an opening of the induction ring,
wherein the induction ring is electrically coupled to an electrical induction field source via a first electrically conductive path provided by electrically conductive surfaces of:
a nozzle head holding the induction ring, and
a purge gas tube holding the nozzle head;
wherein feedstock flowing through the fluid tip is electrically coupled to a charge carrier source via a second electrically conductive path provided by electrically conductive surfaces of:
the fluid tip; and
a fluid tube electrically coupled to the fluid tip; and
wherein the first electrically conductive path and the second electrically conductive path are electrically isolated by an insulating barrier.

2. The electrostatic spray nozzle assembly of claim 1, wherein the insulating barrier is provided at least in part by an atomizing gas cap.

3. The electrostatic spray nozzle assembly of claim 2, wherein the insulating barrier is provided at least in part by an atomizing gas tube coupled to the atomizing gas cap.

4. The electrostatic spray nozzle assembly of claim 1, wherein the induction ring has an inner diameter of one inch.

5. The electrostatic spray nozzle assembly of claim 4, wherein the induction ring has an inner diameter of about 0.7 inches.

6. The electrostatic spray nozzle assembly of claim 1, wherein the induction ring is at least partially coated by an insulating material at an exposed surface.

7. The electrostatic spray nozzle assembly of claim 6, wherein the insulating material is a dielectric material.

8. The electrostatic spray nozzle assembly of claim 7, wherein the insulating material is polytetrafluoroethylene (PTFE).

9. The electrostatic spray nozzle assembly of claim 6, wherein an inner ring surface of the induction ring is electrically conductive.

10. The electrostatic spray nozzle assembly of claim 1, wherein at least externally exposed surfaces of the electrostatic spray nozzle are non-conductive.

11. An electrostatic spray system including:
an electrostatic spray nozzle assembly comprising:
an induction ring; and
a fluid tip,
wherein the induction ring generates an electrical field for inducing an electrical charge on droplets of a feedstock liquid from the fluid tip that pass through an opening of the induction ring,
wherein the induction ring is electrically coupled to an electrical induction field source via a first electrically conductive path provided by electrically conductive surfaces of:
a nozzle head holding the induction ring, and
a purge gas tube holding the nozzle head;
wherein feedstock flowing through the fluid tip is electrically coupled to a charge carrier source via a second electrically conductive path provided by electrically conductive surfaces of:
the fluid tip; and
a fluid tube electrically coupled to the fluid tip; and
wherein the first electrically conductive path and the second electrically conductive path are electrically isolated by an insulating barrier; and
a voltage supply for providing an electrical potential to the induction ring via the first conductive path.

12. The electrostatic spray system of claim 11, wherein the insulating barrier is provided at least in part by an atomizing gas cap.

13. The electrostatic spray system of claim 12, wherein the insulating barrier is provided at least in part by an atomizing gas tube coupled to the atomizing gas cap.

14. The electrostatic spray system of claim 11, wherein the induction ring has an inner diameter of one inch.

15. The electrostatic spray system of claim 14, wherein the induction ring has an inner diameter of about 0.7 inches.

16. The electrostatic spray system of claim 11, wherein the induction ring is at least partially coated by an insulating material at an exposed surface.

17. The electrostatic spray nozzle assembly of claim 16, wherein the insulating material is a dielectric material.

18. The electrostatic spray system of claim 17, wherein the insulating material is polytetrafluoroethylene (PTFE).

19. The electrostatic spray system of claim 16, wherein an inner ring surface of the induction ring is electrically conductive.

20. The electrostatic spray system of claim 11, wherein at least externally exposed surfaces of the electrostatic spray nozzle are non-conductive.

21. The electrostatic spray system of claim 11, wherein the voltage supply is configured to provide the electrical potential at 4,000 volts or less.

22. The electrostatic spray system of claim 11, further comprising:
a sensor providing a feedback signal indicative of operation of the electrostatic spray system, and a controller operating on the feedback signal to adjust the electrical potential.

23. The electrostatic spray system of claim 22, wherein the feedback signal is indicative of electrical current.

* * * * *